UNITED STATES PATENT OFFICE.

FRANÇOIS Z. ROUSSIN, OF PARIS, FRANCE, ASSIGNOR TO ALCIDE FRANÇOIS POIRRIER, OF SAME PLACE.

IMPROVEMENT IN COLORING-MATTERS DERIVED FROM ANILINE AND ITS HOMOLOGUES.

Specification forming part of Letters Patent No. 210,054, dated November 19, 1878; application filed October 22, 1878.

*To all whom it may concern:*

Be it known that I, FRANÇOIS ZACHARIE ROUSSIN, of Paris, France, have invented certain new Artificial Coloring-Matters, obtained by the reaction of the diazoic derivative of sulphanilic acid upon the amines, the amides, and the phenols, of which the following is a specification:

The prime ingredient of these colors is the azoderivative of sulphanilic acid, which is obtained in the following manner:

In a mixture of an alkaline sulphanilate and an alkaline azotite, pour, while briskly agitating, diluted sulphuric acid. There is produced an azoic derivative, which is deposited in the form of a crystalline white powder, if the liquids are sufficiently concentrated. The azoderivative of sulphanilic acid produces, either with naphthylamine and its salts, or with aniline or the two toluïdines and their salts, or the alkaline naphthionates and sulphanilates, red, orange, or yellow coloring-matters analogous to those which I obtain with the azoderivate of naphthionic acid. The azoderivative of sulphanilic acid reacts upon all the phenols and gives coloring-matters. With phenic acid there is obtained a yellow product; with orcine, red; with resorcine, orange; with the naphthols, orange.

I have obtained all the aforementioned products in a state of purity, and well crystallized. Their preparation is very simple, and needs no special instruction, since it is effected by simple mixture (even cold) of the ingredients, which react, according to the case, in a medium either neutral, acid, or alkaline.

All these coloring-matters are absolutely new, and were first discovered by me.

In illustration, I would give the preparation of four coloring-matters, all others being produced under similar or analogous conditions.

To produce a certain orange color, which I denominate "Orangé No. 1," I mix in the same vat, and agitate without interruption during twenty-four hours, ten parts of the diazoic derivative of sulphanilic acid, nine and one-half parts of naphthol-alpha, also in the highest possible state of division, and one hundred parts of cold water. After that time the coloring-matter is formed, and the liquor is boiled, after having added to it one part of sulphuric acid. When the mass is cooled down the coloring-matter may be extracted and thrown upon a filter, washed with cold water, and then desiccated. The substance then presents the form of crystallized powder, with mordoré reflex or luster.

Another orange color, which I call "Orangé No. 2," is produced by mixing in a vat equal equivalents of the diazoic derivative of the sulphanilic acid and of naphthol-beta, dissolved in twenty times its weight of cold water, slightly alkaline. As soon as the mixture is completed the coloring-matter is produced. It is then precipitated by an excess of common salt, (chloride of sodium,) and the precipitate is compressed and then redissolved in boiling water, and finally dried, and the product thus obtained will be in the form of crystals.

The chrysoïne is obtained by mixing in a vat, by means of a rapid stirring action, equal equivalents of the diazoic derivative of sulphanilic acid and of resorcine, dissolved in twenty times its weight of cold water. Agitation of the mixture is continued for twelve hours. The liquid mass which holds the new color in suspension is then thrown upon a fine filter.

To obtain the product, which is in fine crystals, pure and dry, it will suffice to wash the precipitate with cold water and then press and dry it.

Another coloring-matter, which I call "Orangé No. 4," is obtained in the following manner: I place in a vat, provided with stirring mechanism, equal equivalents of the diazoic derivative of sulphanilic acid and of diphenylamine, highly divided. To the mixture is added a sufficient quantity of cold water to produce with them a clear semi-liquid mass. The mass is kept stirred until it becomes entirely soluble in alkaline water. At this time the coloring-matter is entirely formed, and the mass is saturated by a little excess of ammonia. The liquid is then boiled and filtered. On cooling, the ammoniacal salt of the coloring-acid will crystallize. The crystals are then thrown upon a filter and dried.

The preparation of all other coloring-matters derived from the diazoic compound of sulphanilic acid is carried on in the same manner.

The four examples cited will suffice to prevent all errors or uncertainty.

I would observe that the introduction into the composition of all the coloring substances of the sulphuric group is not confined to aniline. Precisely the same results are obtained, first, by transferring to the phenols and amines the sulphuric molecule—these last bodies are then caused to react upon the diazoic derivatives of aniline; second, by causing the diazoic derivatives of aniline to react upon such phenol or such amine as may be desired, and sulpho-conjugating by the ordinary methods the products which are thus being created.

What I claim, and desire to secure by Letters Patent, is—

1. The new artificial coloring-matters herein described, obtained by the reaction of the diazoic derivative of sulphanilic acid upon the amines, the amides, and the phenols, as described.

2. The process of producing colors suitable for dye-stuffs by the reaction of the diazoic derivatives of sulphanilic acid upon the amides, and amines, and phenols, substantially as set forth.

In testimony whereof I have signed my name to this specification before two subscribing witnesses.

Z. ROUSSIN.

Witnesses:
A. POIRRIER,
J. ARMENGAUD, Jeune.